Apr. 24, 1923.
E. C. NEWCOMB
1,453,164
INTERNAL COMBUSTION ENGINE
Filed June 4, 1919
2 Sheets-Sheet 1
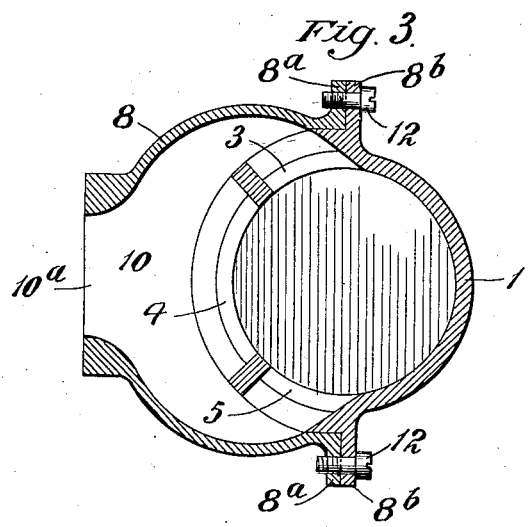
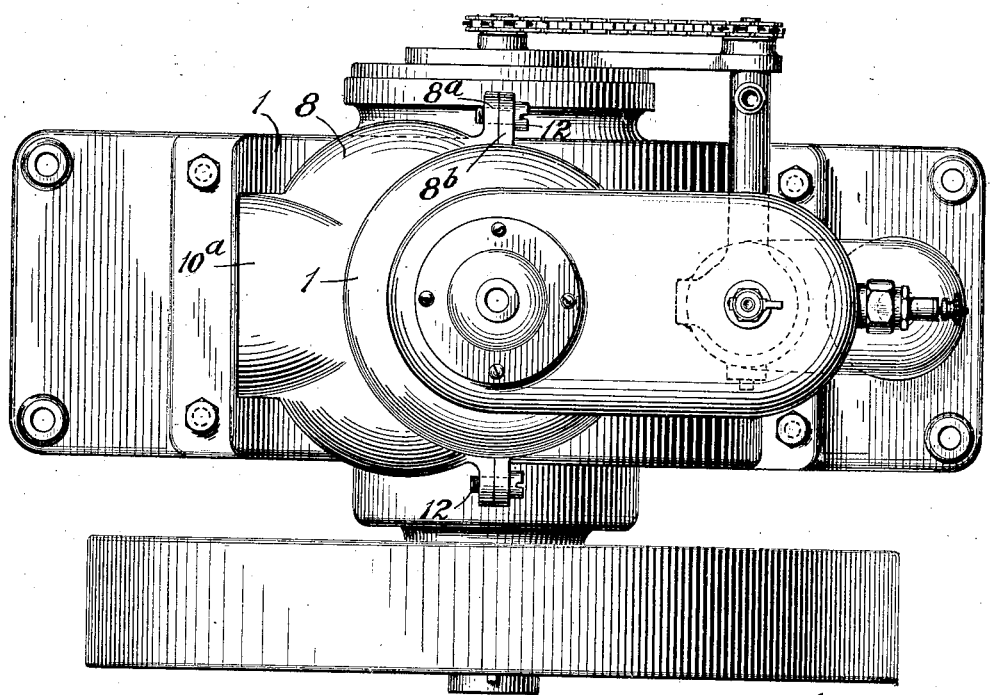

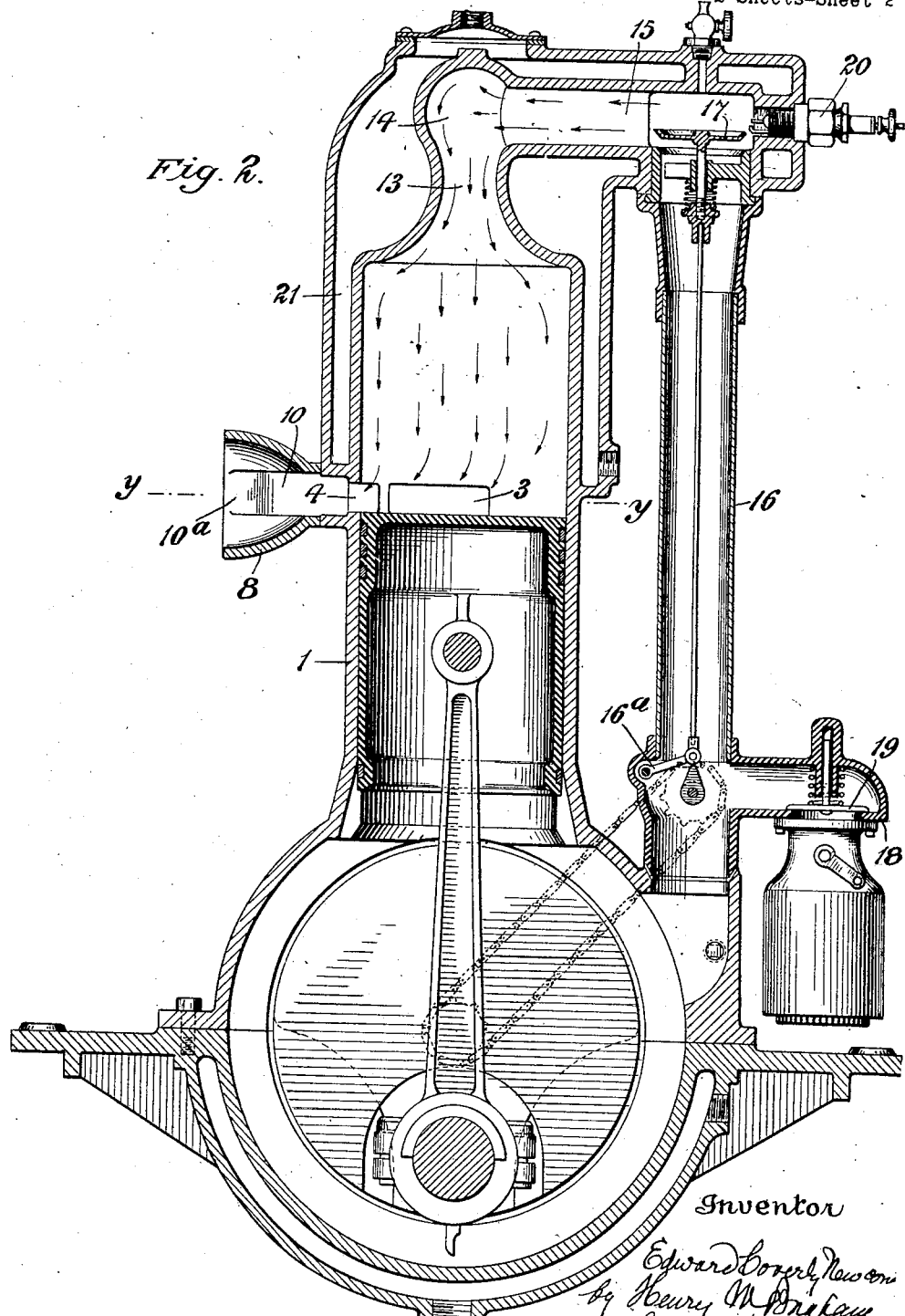

Patented Apr. 24, 1923.

1,453,164

UNITED STATES PATENT OFFICE.

EDWARD COVERLY NEWCOMB, OF NORTH SCITUATE, MASSACHUSETTS.

INTERNAL-COMBUSTION ENGINE.

Application filed June 4, 1919. Serial No. 301,709.

*To all whom it may concern:*

Be it known that I, EDWARD COVERLY NEWCOMB, a citizen of the United States, residing at North Scituate, county of Plymouth, and State of Massachusetts, have invented new and useful Improvements in Internal-Combustion Engines, of which the following is a specification.

My invention relates particularly to engines of the two-cycle type and the objects of my invention are to produce an internal combustion engine of the two-cycle type which shall be readily controlled throughout its entire range; to isolate partial charges of explosive mixture in close proximity to the firing mechanism; to provide means whereby the explosive mixture may expel the burnt gases without substantially commingling therewith; and to provide a clearance chamber in which the flame propagation coincides with the path taken by the mixture as it enters the compression chamber to prevent back-firing.

The other objects of my invention will more fully appear in the following specification and claims:

I have illustrated the preferred embodiment of my invention as applied to an engine of the two-cycle type in the accompanying drawings, in which Fig. 1 is a plan view of my invention. Fig. 2 is an elevation of my invention, partly in section. Fig. 3 is a sectional view on the line $y-y$ of Fig. 2.

Similar numerals refer to similar parts throughout the accompanying drawings.

Two cycle motors as heretofore constructed have proved to be undesirable and inefficient except when operated under substantially a full load. When only a partial charge of explosive mixture was admitted, it mingled to such an extent with the burnt gases in the compression chamber that ignition of the mixture was unreliable and when ignited it burned slowly and imperfectly, which resulted in a loss of power and a marked tendency to back fire, which rendered engines of this type unsuitable for use in automobiles and other vehicles and confined the use of two cycle engines mainly to motor boats and stationary engines where their operation was almost constantly under an approximately full load.

In my invention which is illustrated in the accompanying drawings, I have shown an engine of the two cycle type in which the difficulties mentioned have been avoided by so constructing the compression chamber and so locating the intake valve and firing mechanism that the flame propagation coincides with the path taken by the mixture entering the compression chamber, and the mixture when compressed is ignited at a point adjacent to the intake valve and the compression chamber being so formed that small charges of explosive mixture when entering the compression chamber are isolated adjacent to the firing mechanism without substantially commingling with the burnt gases which remain in the compression chamber. The results of this construction are a very marked increase in efficiency when the engine is operated under small loads and, with small quantities of mixture in each charge, comparatively little of the incoming mixture is mingled with the burnt gases and there are practically no burnt gases intermingled with the mixture adjacent to the firing mechanism and all tendency to back fire is eliminated so that I am able to use a mechanically operated intake valve instead of an automatic spring controlled valve such as has been heretofore used in motors of this type.

Another important result is that the uncontaminated mixture is first ignited and as the mixture is being burned the temperature and compression of the unburned mixture is greatly increased, with the result that the mixture which is mingled more or less with the burnt gases is burned when at a very high temperature and at the maximum pressure, which greatly facilitates the combustion, and results in the production of the maximum amount of energy throughout its entire range.

In practice I have found that I can run my engine idle with about eight percentum of the maximum charge of the explosive mixture, whereas about one-third of a maximum charge is required for this purpose in two cycle engines as heretofore manufactured and that minimum charges of explosive mixture, which are in volume far below the quantity necessary to operate the engine idle, will fire with certainty and without danger of back firing.

As shown in the accompanying drawings my invention has been applied to a single cylinder engine of the two cycle type where the crank case is employed for the compression of the explosive mixture in order that it may be forced into the combustion chamber.

As shown in the drawings the casting 1 forms the cylinder walls, water jacket and upper half of the crank case. I provide exhaust ports 3, 4 and 5 in the cylinder wall which are uncovered by the piston in its downward stroke. The casting 8 forms an expansion chamber 10, into which the spent gases are exhausted through the ports 3, 4 and 5, and from which they pass through the orifice 10$^a$. The capacity and conformation of the expansion chamber 10 and of the exhaust ports are such that the burnt gases readily and freely pass from all parts of the expansion chamber 10 without mutual interference and the lines of flow of the burn gases through the exhaust ports and expansion chamber are such that there will be no interference between the several streams, but, on the contrary, the exhaust gases flowing through the central port 4 will be of material aid to the exit of the gases through the ports 3 and 5. If desired, an exhaust pipe of the usual type may be secured to the outlet end of the expansion chamber. The casting 8 is secured in place by studs 12 which pass through lugs 8$^a$ cast thereon, and lugs 8$^b$ on the casting 1. The compression chamber which is formed in the head of the cylinder and into which all of the gases are compressed at the end of the compression stroke, is of peculiar shape and construction in that the walls of the cylinder head are contracted and then expanded to form a venturi 13, which is in open communication with a spherical equalizing or rectifying chamber 14, in which the various currents of incoming mixture are rectified and equalized so that they advance at substantially the same rate of travel and without disturbing eddies. Extending horizontally therefrom and preferably so positioned with reference thereto that the projected centre line thereof will pass through the centre of said chamber 14, is an ignition chamber 15 which openly discharges into the equalizing chamber 14. This horizontal chamber 15 is of comparatively small cross-sectional area and its total capacity is approximately one-half the capacity of the chambers 13 and 14 and the total capacity of the chambers 13, 14 and 15, which constitute the clearance space or compression chamber, is approximately one-third of the total capacity of the combustion chamber. I prefer to construct the horizontal chamber 15 of approximately the same length as the piston stroke, having found that a chamber of these proportions is adapted to produce the desired results in that it will satisfactorily isolate partial charges of explosive mixture and prevent back firing under all conditions of operation, including minimum and slow burning charges of explosive mixture. I provide a transfer pipe 16 which communicates at its lower end with the crank case in which the explosive mixture is compressed prior to its introduction into the expansion chamber. The throttle valve 16$^a$ is located near the lower end of the pipe 16 and the upper end of the pipe 16 is in communication with the chamber 15 when the inlet valve 17 is lifted from its seat. I have purposely mounted the valve 17 and the mechanism by which it is operated entirely within transfer tube 16 thereby preventing all possibility of air leaks around the stem of the valve which when valves are mounted in accordance with the usual construction cause serious disturbances to the mixture, particularly when the engine is throttled down. My construction also eliminates any possibility of loss of mixture around the valve stem. The carbureter is secured to the flange 18.

The automatic inlet valve 19 is of the usual type. The firing means 20 is preferably a jump spark plug of the usual type and is mounted at the outer end of the ignition chamber 15 in close proximity to the valve 17. The cylinder is provided with the usual water jacket 21. The other parts are too well known to require description.

In order to obtain the maximum efficiency with an engine of the two-cycle type, it is necessary that the burnt gases remaining in the cylinder at the end of the expansion stroke shall be wholly or partly exhausted and displaced by the explosive mixture and that there shall be the least possible intermingling of the explosive mixture with the remaining burnt gases; that explosive mixture which is free from burnt gases shall be isolated in proximity to the firing mechanism and that the direction of flame propagation shall be substantially the same as the travel of the incoming mixture in order to insure the burning first of the mixture which is not commingled with the burnt gases in the cylinder and the burning of that portion of the mixture which is more or less intermingled with the burnt gases at a temperature and pressure which is rapidly raised as the mixture is burned.

By my construction the combustion begins at the outer end of the chamber 15, and the flame propagation is through the ignition chamber 15, the equalizing chamber 14, the venturi 13, and downward through the cylinder until it is completed, with the result that the mixture in close proximity to the firing plug 20 which is not commingled with the burnt gases remaining in the cylinder, is first ignited, and as the flame is propagated through the ignition chamber 15, the equalizing chamber 14 and the venturi 13, the temperature and pressure are rapidly increased as the zone is approached in which the mixture is more or less commingled with burnt gases which insures the effective and rapid combustion thereof. It is also obvious that this construction will result in any gases which may still be burning being isolated so far from the intake valve 17 that all danger of back-firing will be eliminated even when a mechanically operated intake valve 17 is employed, which enables me to eliminate screens and other expedients which have heretofore been necessarily employed to prevent back firing and which seriously interfere with the free flow of mixture into the compression chamber.

The operation of my invention is as follows:

On the upward stroke of the piston the valve 19 is lifted and explosive mixture is drawn from the carbureter down into the tube 16 and into the crank case, if a sufficient charge is admitted. On the return stroke of the piston the explosive mixture in the crank case and tube 16 is compressed and when the exhaust ports have been uncovered by the piston and the pressure in the cylinder has fallen to approximately atmospheric pressure, the valve 17 is lifted and the explosive mixture flows into the outer end of the chamber 15 and passes forward in the direction of the arrows as shown in Fig. 2, into the equalizing chamber 14, where the rate of flow is equalized, and the mixture passes downward into the cylinder at a practically uniform rate of travel, expelling the burnt gases through the ports 3, 4 and 5, without substantially commingling therewith.

It is apparent that when the throttle valve 16ª is nearly closed and only a small quantity of explosive mixture is admitted, that the mixture so admitted will practically all remain in the chambers 13, 14 and 15, where it will be isolated and have but little opportunity to mingle with the burnt gases in the expansion chamber and that the mixture in proximity to the firing plug 20 will not be commingled to any substantial extent with any of the burnt gases. It is well known that with engines of the usual type when but a small charge of mixture is introduced the percentage of mixture that mingles with the burnt gases is much larger than when a full charge is introduced and it is, therefore, desirable that when small charges are introduced the mixture should be much richer in fuel than when a full charge is admitted. With my construction I find that substantial enrichment of the mixture when small charges are admitted is not desirable because the commingling of the mixture with the burnt gases is very much reduced and the mixture so commingled is burnt under high compression.

It is to be understood that my invention as to its broader aspects is not limited to the precise construction herein set forth, as many changes may be made therein without departing from the spirit of my invention and without sacrificing its chief advantages.

I claim:

1. An explosive engine comprising in combination a cylinder, a piston mounted to reciprocate therein, a clearance chamber comprising an ignition chamber, an equalizing chamber and a venturi in open communication between said equalizing chamber and said cylinder, an intake valve located at or near the outer end of said ignition chamber and electrical firing mechanism operating in the ignition chamber and located adjacent to said intake valve.

2. An explosive engine comprising in combination a cylinder, a piston mounted to reciprocate therein, a clearance chamber comprising an ignition chamber, the axis of which lies at an angle to the axis of the cylinder, an equalizing chamber into which the ignition chamber discharges and a frusto-conical port through which the equalizing chamber discharges into the cylinder, an intake valve located at or near the outer end of said ignition chamber, an electrical firing mechanism operating in the ignition chamber and located adjacent to said intake valve.

3. An internal combustion engine comprising in combination a piston, a piston cylinder, a clearance chamber, consisting of an ignition chamber, the axis of which is not coincident with the axis of the piston cylinder, a flow re-organization chamber into which the ignition chamber discharges, and a venturi like port through which said flow re-organization chamber discharges into the piston cylinder, the axis of such port being substantially co-incident with the axis of the piston cylinder and the diameter expanded to substantially that of the piston cylinder where it discharges into the piston cylinder and an intake port located adjacent to the outer end of said ignition chamber.

4. An internal combustion engine comprising in combination a piston, a piston cylinder, a clearance chamber, consisting of an ignition chamber, the axis of which is not coincident with the axis of the piston cylinder, a flow re-organization chamber into which the ignition chamber discharges, and a venturi like port through which said flow re-organization chamber discharges into the piston cylinder, the axis of said port being approximately coincident with the axis of the piston cylinder and the diameter expanded to substantially that of the piston cylinder where it discharges into the piston cylinder, and intake port located adjacent to the outer end of said ignition chamber, and firing mechanism operating adjacent to said intake valve.

5. An internal combustion engine comprising in combination a piston, a piston cylinder, a clearance chamber, consisting of an ignition chamber, the axis of which is not coincident with the axis of the piston cylinder, a flow re-organization chamber into which the ignition chamber discharges, and a venturi like port through which said flow re-organization chamber discharges into the piston cylinder, the axis of said port being substantially coincident with the axis of the piston cylinder and the diameter expanded to substantially that of the piston cylinder where it discharges into the piston cylinder, an intake port located adjacent to the outer end of said ignition chamber, and an exhaust port in the wall of the piston cylinder adapted to be uncovered by the piston.

6. An internal combustion engine comprising in combination a piston, a piston cylinder, a clearance chamber, consisting of an ignition chamber, the axis of which is not coincident with the axis of the piston cylinder, a flow re-organization chamber into which the ignition chamber discharges, and a venturi like port through which said flow re-organization chamber discharges into the piston cylinder, the axis of said port being substantially coincident with the axis of the piston cylinder and the diameter expanded to substantially that of the piston cylinder where it discharges into the piston cylinder, an intake port located adjacent to the outer end of said ignition chamber, an exhaust port in the wall of the piston cylinder adapted to be uncovered by the piston, and firing mechanism operating adjacent to said intake port.

7. An internal combustion engine, comprising in combination a piston, a piston cylinder, and a clearance chamber, consisting of an ignition chamber, the axis of which is not coincident to the axis of the piston cylinder, a flow re-organization chamber into which the ignition chamber discharges, and a venturi like port through which the flow re-organization chamber discharges into the piston cylinder, the conformation of said re-organization chamber and of said port being such that the fresh mixture will advance into the piston cylinder with a substantially even front and velocity, and in a stream having substantially the same cross sectional areas as the piston cylinder, and an intake port located near the outer end of said ignition chamber.

8. An internal combustion engine, comprising in combination a piston, a piston cylinder, a clearance chamber, consisting of an ignition chamber, the axis of which is not coincident with the axis of the piston cylinder, a flow re-organization chamber into which the ignition chamber discharges, and a venturi like port through which the flow re-organization chamber discharges into the piston cylinder, the conformation of said re-organization chamber and of said port being such that the fresh mixture will advance into the piston cylinder with a substantially even front and velocity, and in a stream having substantially the same cross sectional area as the piston cylinder, an intake port located near the outer end of said ignition chamber and firing mechanism operating adjacent to said intake port.

9. An internal combustion engine comprising in combination a piston, a piston cylinder, a clearace chamber consisting of an ignition chamber, the axis of which is not coincident with the axis of the piston cylinder, a flow re-organization chamber and a venturi like port, through which the flow re-organization chamber discharges into the piston cylinder, the conformation of said flow re-organization chamber and said port being such as to cause the fresh mixture to flow into the piston chamber in a stream the cross sectional area of which is substantially equal to the cross sectional area of the piston cylinder and an intake port near the outer end of said ignition chamber.

10. An internal combustion engine comprising in combination a piston, a piston cylinder, a clearance chamber, consisting of an ignition chamber, the axis of which is not coincident with the axis of the piston cylinder, a flow re-organization chamber and a venturi like port, through which the flow re-organization chamber discharges into the piston cylinder, the conformation of said flow re-organization chamber, and said port being such as to cause the fresh mixture to flow into the piston chamber in a stream the cross sectional area of which is substantially equal to the cross sectional area of the piston cylinder, an intake port near the outer end of said ignition chamber, and firing mechanism operating adjacent to said intake port.

11. An internal combustion engine comprising in combination a piston, a piston cylinder, a clearance chamber, consisting of an ignition chamber, the axis of which is not coincident with the axis of the piston cylinder, a flow re-organization chamber having a venturi like discharge port adapted to laterally expand, the inflowing mixture from the ignition chamber prior to its entry into the piston cylinder and an intake port adjacent to the outer end of said ignition chamber.

12. An internal combustion engine comprising in combination a piston, a piston cylinder, a clearance chamber, consisting of an ignition chamber, the axis of which is not coincident with the axis of the piston cylinder, a flow re-organization chamber having a venturi like discharge port adapted to laterally expand, the inflowing mixture from the ignition chamber prior to its entry into the piston cylinder, an intake port adjacent to the outer end of said ignition chamber and firing mechanism operating adjacent to said intake port.

13. A two cycle internal combustion engine in which the clearance space consists of an ignition chamber of relatively small cross sectional area, inlet and ignition means at the far end thereof; a flow reorganization chamber of substantially greater cross sectional area than said ignition chamber, and into which the ignition chamber discharges, and a venturi like discharge outlet from the flow reorganzation chamber to the cylinder through a throat of less cross sectional area than the reorganization chamber.

14. A two cycle internal combustion engine in which the clearance space is of greater length than the piston stroke and the inlet and the ignition means are at the far end thereof, the major portion of the length of said clearance space from the inlet, toward the cylinder, being a relatively small diameter chamber, and a reorganization chamber of substantially greater cross section than said major length chamber into which said small diameter chamber discharges and a discharge outlet leading to the engine cylinder through a throat of less cross section than the reorganization chamber.

15. A two cycle internal combustion engine of the type in which the clearance space is of much less volume than the cylinder space and of greater length than the piston stroke and the inlet and the ignition means are at the far end thereof, the major portion of the length of said clearance space being a relatively small diameter primary ignition chamber and the minor portion of said length comprising a reorganization chamber of substantially greater cross section than said primary ignition chamber into which the latter discharges, and a venturi like expansion portion including a throat of less cross section than the reorganization chamber by which the reorganization chamber discharges into the engine cylinder.

16. An internal combustion engine having a clearance space comprising a passage which is long as compared with its diameter, having an inlet and firing device at the remote end thereof and a venturi like outlet at the other end thereof, such passage comprising a plurality of portions having approximately straight line axes intersecting at high angle, the portion of the passage at the intersecting angle being formed as a bulbous enlargement for the purposes described and the axis of the venturi like discharge throat being substantially coincident with the axis of the cylinder.

17. A two cycle combustion engine in which the clearance space consists of a relatively long ignition chamber, the cross sectional area of which is restricted but not beyond the dimensions which will permit a full charge of mixture to enter the cylinder without substantially restricting the flow thereof; an inlet and firing means at the remote end thereof; a flow reorganization chamber of greater cross sectional area than said ignition chamber, and into which the ignition chamber discharges, and a venturi like discharge outlet from the flow reorganization chamber to the cylinder through a throat of less cross sectional area than the reorganization chamber.

18. An explosive engine comprising in combination a cylinder, a piston mounted to reciprocate therein, exhaust ports in the cylinder wall adapted to be covered and uncovered by the piston, a clearance chamber comprising an ignition chamber, an equalizing chamber and a venturi in open communication between said equalizing chamber and said cylinder, an intake valve located at or near the outer end of said ignition chamber and electrical firing mechanism operating in the ignition chamber and located adjacent to said intake valve.

19. An internal combustion engine comprising in combination a piston, a piston cylinder, exhaust ports in the cylinder wall adapted to be covered and uncovered by the piston, a clearance chamber, consisting of an ignition chamber, the axis of which is not coincident with the axis of the piston cylinder, a flow reorganization chamber into which the ignition chamber discharges, and a venturi like port through which said flow reorganization chamber discharges into the piston cylinder, the axis of such port being substantially coincident with the axis of the piston cylinder and the diameter expanded to substantially that of the piston cylinder where it discharges into the piston cylinder and an intake port located adjacent to the outer end of said ignition chamber.

20. An internal combustion engine comprising in combination a piston, a piston cylinder, exhaust ports in the cylinder wall adapted to be covered and uncovered by the piston, a clearance chamber, consisting of an ignition chamber, the axis of which is not coincident with the axis of the piston cylinder, a flow reorganization chamber into which the ignition chamber discharges, and a venturi like port through which said flow reorganization chamber discharges into the piston cylinder, the axis of said port being approximately coincident with the axis of the piston cylinder and the diameter expanded to substantially that of the piston cylinder where it discharges into the piston cylinder, an intake port located adjacent to the outer end of said ignition chamber, and firing mechanism operating adjacent to said intake valve.

21. An internal combustion engine comprising in combination a piston, a piston cylinder, exhaust ports in the cylinder wall adapted to be covered and uncovered by the piston, a clearance chamber, consisting of an ignition chamber, the axis of which is not coincident with the axis of the piston cylinder, a flow reorganization chamber into which the ignition chamber discharges, and a venturi like port through which said flow reorganization chamber discharges into the piston cylinder, the axis of said port being substantially coincident with the axis of the piston cylinder and the diameter expanded to substantially that of the piston cylinder where it discharges into the piston cylinder, an intake port located adjacent to the outer end of said ignition chamber, and an exhaust port in the wall of the piston cylinder adapted to be uncovered by the piston.

22. An internal combustion engine comprising in combination a piston, a piston cylinder, exhaust ports in the cylinder wall adapted to be covered and uncovered by the piston, a clearance chamber consisting of an ignition chamber, the axis of which is not coincident with the axis of the piston cylinder, a flow reorganization chamber into which the ignition chamber discharges, and a venturi like port through which said flow reorganization chamber discharges into the piston cylinder, the axis of said port being substantially coincident with the axis of the piston cylinder and the diameter expanded to substantially that of the piston cylinder where it discharges into the piston cylinder, an intake port located adjacent to the outer end of said ignition chamber, an exhaust port in the wall of the piston cylinder adapted to be uncovered by the piston, and firing mechanism operating adjacent to said intake port.

23. An internal combustion engine, comprising in combination a piston, a piston cylinder, exhaust ports in the cylinder wall adapted to be covered and uncovered by the piston, a clearance chamber, consisting of an ignition chamber, the axis of which is not coincident to the axis of the piston cylinder, a flow reorganization chamber into which the ignition chamber discharges, and a venturi like port through which the flow reorganization chamber discharges into the piston cylinder, the conformation of said reorganization chamber and of said port being such that the fresh mixture will advance into the piston cylinder with a substantially even front and velocity, and in a stream having substantially the same cross sectional area as the piston cylinder, and an intake port located near the outer end of said ignition chamber.

24. An internal combustion engine, comprising in combination a piston, a piston cylinder, exhaust ports in the cylinder wall adapted to be covered and uncovered by the piston, a clearance chamber, consisting of an ignition chamber, the axis of which is not coincident with the axis of the piston cylinder, a flow reorganization chamber into which the ignition chamber discharges, and a venturi like port through which the flow reorganization chamber discharges into the piston cylinder, the conformation of said reorganization chamber and of said port being such that the fresh mixture will advance into the piston cylinder with a substantially even front and velocity, and in a stream having substantially the same cross sectional area as the piston cylinder, an intake port located near the outer end of said ignition chamber and firing mechanism operating adjacent to said intake port.

25. An internal combustion engine comprising in combination a piston, a piston cylinder, exhaust ports in the cylinder wall adapted to be covered and uncovered by the piston, a clearance chamber consisting of an ignition chamber, the axis of which is not coincident with the axis of the piston cylinder, a flow reorganization chamber and a venturi like port, through which the flow reorganization chamber discharges into the piston cylinder, the conformation of said flow reorganization chamber and said port being such as to cause the fresh mixture to flow into the piston chamber in a stream the cross sectional area of which is substantially equal to the cross sectional area of the piston cylinder and an intake port near the outer end of said ignition chamber.

26. An internal combustion engine comprising in combination a piston, a piston cylinder, exhaust ports in the cylinder wall adapted to be covered and uncovered by the piston, a clearance chamber, consisting of an ignition chamber, the axis of which is not coincident with the axis of the piston cylinder, a flow reorganization chamber and a venturi like port, through which the flow reorganization chamber discharges into the piston cylinder, the conformation of said flow reorganization chamber, and said port being such as to cause the fresh mixture to flow into the piston chamber in a stream the cross sectional area of which is substantially equal to the cross sectional area of the piston cylinder, an intake port near the outer end of said ignition chamber, and firing mechanism operating adjacent to said intake port.

27. An internal combustion engine comprising in combination a piston, a piston cylinder, exhaust ports in the cylinder wall adapted to be covered and uncovered by the piston, a clearance chamber, consisting of an ignition chamber, the axis of which is not coincident with the axis of the piston cylinder, a flow reorganization chamber having a venturi like discharge port adapted to laterally expand the inflowing mixture from the ignition chamber prior to its entry into the piston cylinder and an intake port adjacent to the outer end of said ignition chamber.

28. An internal combustion engine comprising in combination a piston, a piston cylinder, exhaust ports in the cylinder wall adapted to be covered and uncovered by the piston, a clearance chamber, consisting of an ignition chamber, the axis of which is not coincident with the axis of the piston cylinder, a flow reorganization chamber having a venturi like discharge port adapted to laterally expand the inflowing mixture from the ignition chamber prior to its entry into the piston cylinder, an intake port adjacent to the outer end of said ignition chamber and firing mechanism operating adjacent to said intake port.

29. An internal combustion engine comprising in combination a piston cylinder, exhaust ports in the cylinder wall adapted to be covered and uncovered by the piston, and a clearance chamber consisting of an ignition chamber, the axis of which is not coincident with the axis of the piston chamber, a flow reorganization chamber into which the ignition chamber discharges and a port through which the flow reorganization chamber discharges into the piston chamber expanded at its discharge end to approximately the diameter of the piston cylinder, and an intake port located adjacent to the outer end of said ignition chamber.

30. An internal combustion engine comprising in combination a piston cylinder, exhaust ports in the cylinder wall adapted to be covered and uncovered by the piston, and a clearance chamber consisting of an ignition chamber, the axis of which is not coincident with the axis of the piston chamber, a flow reorganization chamber into which the ignition chamber discharges, and a port through which the flow reorganization chamber discharges into the piston chamber expanded at its discharge end to approximately the diameter of the piston cylinder, an intake port located adjacent to the outer end of said ignition chamber and firing mechanism adjacent to said intake port.

31. An internal combustion engine comprising in combination a piston cylinder, and a clearance chamber consisting of an ignition chamber, the axis of which is not coincident with the axis of the piston chamber, a flow re-organization chamber into which the ignition chamber discharges and a port through which the flow re-organization chamber discharges into the piston chamber expanded at its discharge end to approximately the diameter of the piston cylinder, and an intake port located adjacent to the outer end of said ignition chamber.

32. An internal combustion engine comprising in combination a piston cylinder, and a clearance chamber consisting of an ignition chamber, the axis of which is not coincident with the axis of the piston chamber, a flow re-organization chamber into which the ignition chamber discharges, and a port through which the flow re-organization chamber discharges into the piston chamber expanded at its discharge end to approximately the diameter of the piston cylinder, an intake port located adjacent to the outer end of said ignition chamber and firing mechanism adjacent to said intake port.

Signed at New York city, in the county of New York and State of New York, this 15th day of May, 1919.

EDWARD COVERLY NEWCOMB.

Witnesses:
MARGARET A. HECK,
PAUL R. JAMES.